(12) United States Patent
Vitale

(10) Patent No.: US 11,985,406 B2
(45) Date of Patent: *May 14, 2024

(54) INTEGRATED SENSOR AND LENS ASSEMBLY MOUNT

(71) Applicant: GoPro, Inc., San Mateo, CA (US)

(72) Inventor: Nicholas Vitale, Foster City, CA (US)

(73) Assignee: GoPro, Inc., San Mateo, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 18/177,559

(22) Filed: Mar. 2, 2023

(65) Prior Publication Data

US 2023/0209166 A1 Jun. 29, 2023

Related U.S. Application Data

(63) Continuation of application No. 17/348,724, filed on Jun. 15, 2021, now Pat. No. 11,606,488.

(51) Int. Cl.
| | |
|---|---|
| *H04N 23/55* | (2023.01) |
| *G02B 7/00* | (2021.01) |
| *G02B 7/02* | (2021.01) |
| *G03B 11/04* | (2021.01) |
| *H04N 23/54* | (2023.01) |

(52) U.S. Cl.
CPC ............. *H04N 23/55* (2023.01); *G02B 7/003* (2013.01); *G02B 7/021* (2013.01); *G03B 11/04* (2013.01); *G03B 11/045* (2013.01); *H04N 23/54* (2023.01)

(58) Field of Classification Search
CPC ........ H04N 23/55; H04N 23/54; G02B 7/003; G02B 7/021; G03B 2217/002; G03B 37/04; G03B 17/02; G03B 11/04; G03B 11/045

See application file for complete search history.

(56) References Cited

U.S. PATENT DOCUMENTS

| 10,701,249 B1 | 6/2020 | Guo | |
|---|---|---|---|
| 11,425,286 B2 | 8/2022 | Nicholas | |
| 11,606,488 B2* | 3/2023 | Vitale | ..................... G03B 17/02 |
| 2002/0130963 A1* | 9/2002 | Gelbard | ................. G03B 17/14 |
| | | | 348/374 |
| 2007/0133977 A1* | 6/2007 | Mayumi | ................. H04N 23/51 |
| | | | 348/E5.026 |
| 2010/0165188 A1 | 7/2010 | Jannard | |
| 2013/0111464 A1 | 5/2013 | Markas | |
| 2013/0128104 A1 | 5/2013 | Nunnink | |

(Continued)

FOREIGN PATENT DOCUMENTS

CN 216595712 U 5/2022

*Primary Examiner* — Abdelaaziz Tissire
(74) *Attorney, Agent, or Firm* — Young Basile Hanlon & MacFarlane, P.C.

(57) ABSTRACT

An image capture device including a bayonet, an integrated sensor and lens assembly (ISLA), and fasteners. The bayonet includes a mounting flange that connects the bayonet to a first surface the image capture device, a central portion, and connection recesses located within the central portion. The ISLA includes: a forward end that aligns with the connection recesses; a rearward end; internal lenses located within the ISLA and being aligned along an optical axis; and an integrated sensor connected to the rearward end and located along the optical axis. The fasteners extending through the central portion into the forward end of the lens assembly to connect the ISLA to the bayonet.

20 Claims, 8 Drawing Sheets

(56) References Cited

U.S. PATENT DOCUMENTS

| | | |
|---|---|---|
| 2013/0129335 A1 | 5/2013 | Gainer |
| 2013/0182179 A1 | 7/2013 | Page |
| 2013/0343735 A1 | 12/2013 | Zhang |
| 2014/0098225 A1 | 4/2014 | Rodriguez |
| 2014/0160304 A1 | 6/2014 | Galor |
| 2015/0293430 A1 | 10/2015 | O'Neill |
| 2016/0174408 A1 | 6/2016 | Tolbert |
| 2016/0274338 A1 | 9/2016 | Davies |
| 2016/0349601 A1 | 12/2016 | Kungl |
| 2017/0062303 A1 | 3/2017 | Lee |
| 2017/0064159 A1 | 3/2017 | Lee |
| 2017/0102513 A1 | 4/2017 | Ogata |
| 2017/0223239 A1 | 8/2017 | Petty |
| 2018/0027152 A1* | 1/2018 | Sheridan .............. H04N 13/239 348/47 |
| 2018/0224717 A1 | 8/2018 | Matsuzawa |
| 2019/0056643 A1* | 2/2019 | Chang .................... H04N 23/55 |
| 2022/0353400 A1 | 11/2022 | Nicholas |
| 2022/0400192 A1 | 12/2022 | Nicholas |
| 2022/0400196 A1 | 12/2022 | Nicholas |

\* cited by examiner

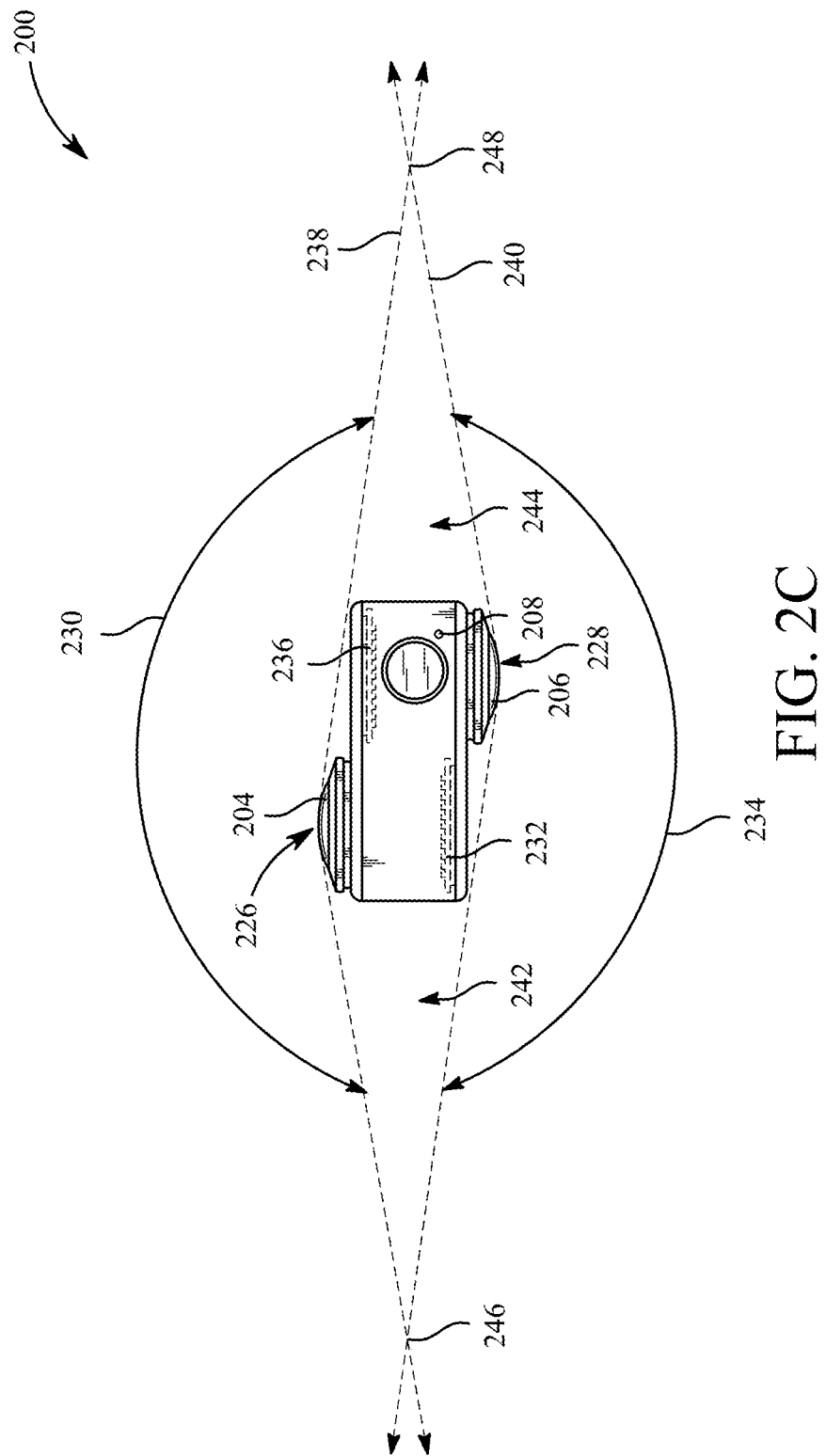

INTEGRATED SENSOR AND LENS ASSEMBLY MOUNT

CROSS REFERENCE TO RELATED APPLICATION(S)

This disclosure is a continuation of U.S. application Ser. No. 17/348,724, filed on Jun. 15, 2021, now U.S. Pat. No. 11,606,724, the entire disclosure of which is incorporated by reference herein.

TECHNICAL FIELD

This disclosure relates generally to a mounting structure for a camera having an optical system including an integrated sensor and lens assembly and specifically to a mounting structure of the integrated sensor and lens assembly of the optical system that avoids fastener interference with an integrated sensor.

BACKGROUND

Typical cameras include one or more lenses and one or more image sensors. The image sensor(s) is aligned with the lens(es) so that images may be taken through the lens(es). The image sensor(s) and lens(es) are connected within an image capture device so that alignment of the image sensor(s) and lens(es) is maintained. The image sensor(s) and lens(es) may be connected to a frame or to each other so that alignment is achieved and maintained. These attachments may constrain the size and/or shape of the image sensor(s), the lens(es), or both so that the components may be connected within a body of a camera.

SUMMARY

Disclosed herein are implementations of a mounting structure (e.g., a bayonet) that connects a lens assembly within an image capture device while aligning the lens assembly with an integrated sensor without the connection interfering with the integrated sensor and the lens assembly.

The present teachings provide an image capture device including a bayonet and an integrated sensor and lens assembly (ISLA). The bayonet is connected to a body of the image capture device. The ISLA is connected to the bayonet. All or a portion of the ISLA extends into the body of the image capture device. The ISLA includes a forward end, a rearward end, a lens assembly, and an integrated sensor. The integrated sensor is connected to the rearward end of the lens assembly. Fasteners extend through the bayonet into the forward end of the ISLA to connect the ISLA to the bayonet.

The present teachings provide an image capture device. The image capture device has a body and an integrated sensor and lens assembly (ISLA). The ISLA is located at least partially within the body of the image capture device. The ISLA includes a lens assembly and an integrated sensor. The lens assembly has a forward end and a rearward end, with the lens assembly having a footprint. The integrated sensor has a forward side connected to the rearward end of the lens assembly, with 50 percent or more of the footprint of the lens assembly being concealed by a footprint of the integrated sensor when the integrated sensor is connected to the rearward end of the lens assembly.

The present teachings provide an image capture device. The image capture device has a bayonet connected to a body of the image capture device and an integrated sensor and lens assembly (ISLA). The ISLA is connected to the bayonet and extends into and located within the body of the image capture device. The ISLA includes the integrated sensor and a lens module. The ISLA has a forward end and a rearward end. The fasteners extend through the bayonet into the forward end of the ISLA to connect the ISLA to the bayonet. The lens module comprising lenses, wherein the lens module is connected to the image capture device in front of the forward end of the ISLA along an optical axis of the image capture device.

The present teachings provide an image capture device. The image capture device including a bayonet, an integrated sensor and lens assembly (ISLA), and fasteners. The bayonet includes a mounting flange that connects the bayonet to a first surface the image capture device, a central portion, and connection recesses located within the central portion. The ISLA includes: a forward end that aligns with the connection recesses; a rearward end; internal lenses located within the ISLA and being aligned along an optical axis; and an integrated sensor connected to the rearward end and located along the optical axis. The fasteners extending through the central portion into the forward end of the lens assembly to connect the ISLA to the bayonet.

The present teachings provide: an image capture device including a body, an integrated sensor and lens assembly (ISLA), an integrated sensor. The ISLA is located entirely within the body of the image capture device and includes: a lens assembly. The lens assembly includes a forward end; a rearward end; and internal lenses located within the lens assembly and extending along an optical axis between the forward end and the rearward end. The integrated sensor connected to the rearward end of the lens assembly, wherein the rearward end of the lens assembly has a footprint and the integrated sensor has a sensor footprint, wherein the sensor footprint conceals between about 50 percent and about 100 percent of the footprint of the lens assembly when viewed along the optical axis.

The present teachings provide an image capture device including a bayonet, an integrated sensor and lens assembly (ISLA), fasteners, and a lens module. The bayonet is connected to the image capture device. The ISLA is connected to the bayonet. The ISLA includes a lens assembly. The lens assembly includes a forward end, a rearward end; and an integrated sensor connected to the rearward end. The fasteners extend through the bayonet into the forward end of the lens assembly. The lens module connected to the bayonet and located forward of the ISLA along an optical axis of the image capture device.

Additional teachings are described in further detail below.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 2C is a top view of the image capture device of FIGS. 2A-B.

DETAILED DESCRIPTION

As technology advances, consumers have increasing demands for more computing power, more options, or additional functionality in electronic devices. These increases in computing power or functionality may result in additional components being added into an image capture device, an increase in size of an integrated sensor for the image capture device, or both. These additional components or larger integrated sensors reduce the amount of packaging space available to locate components relative to each other. For example, a larger integrated sensor may be more difficult to align with a lens assembly then a smaller integrated lens assembly as the line of sight may be obscured. Thus, the present teachings provide a fastening scheme to connect an integrated sensor and lens assembly (ISLA) within an image capture device where fastening occurs irrespective of packaging space within the image capture device or a size of an integrated sensor. The fastening scheme taught herein seeks to avoid a connection around the integrated sensor such that the integrated sensor may be moved, enlarged, changed, or a combination thereof without interfering with installation of the ISLA.

Figure 1A:
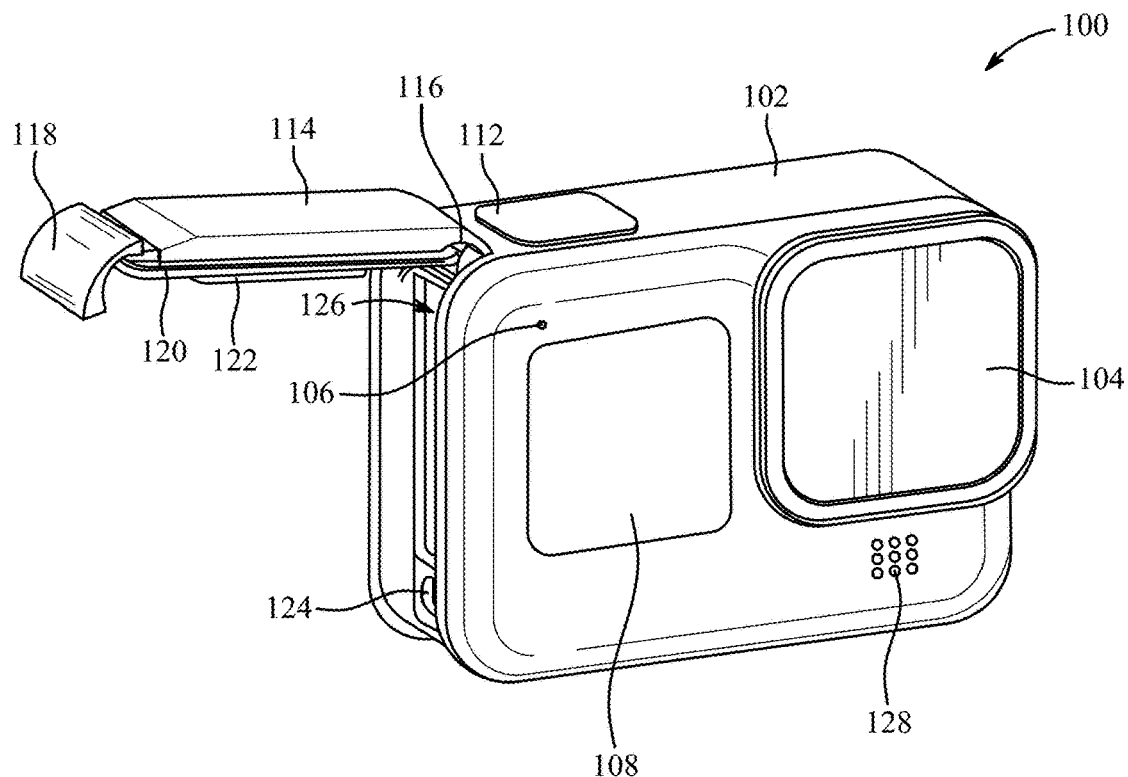
FIGS. 1A-B are isometric views of an example of an image capture device.
Figure 1B:
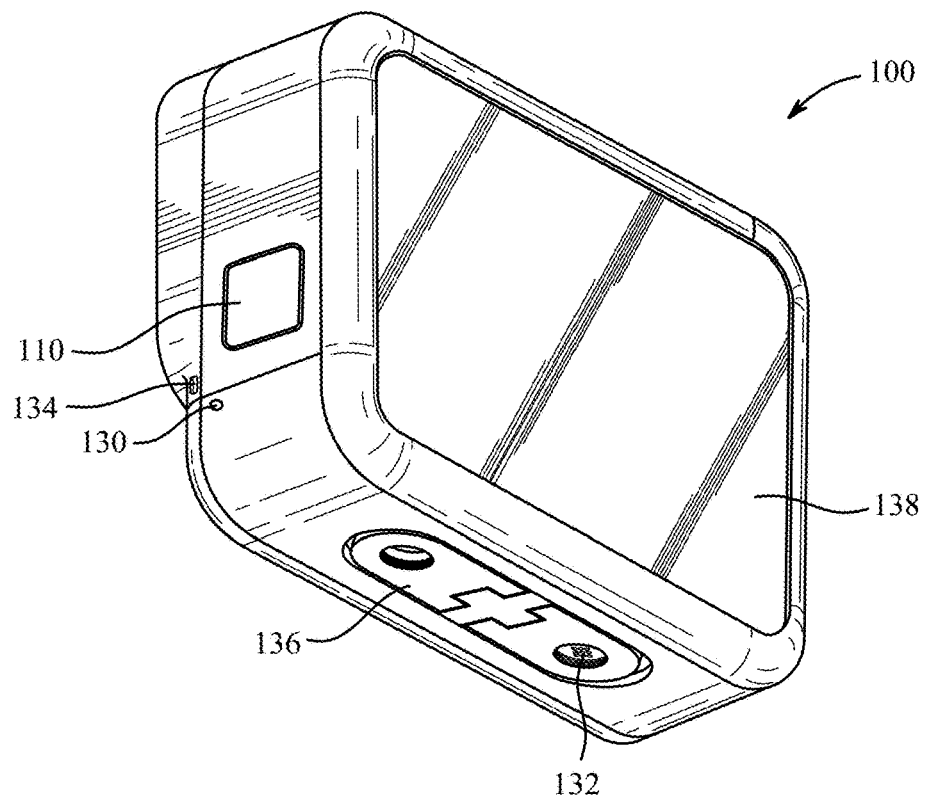

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor (e.g., integrated sensor) internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors (e.g., integrated sensors), such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
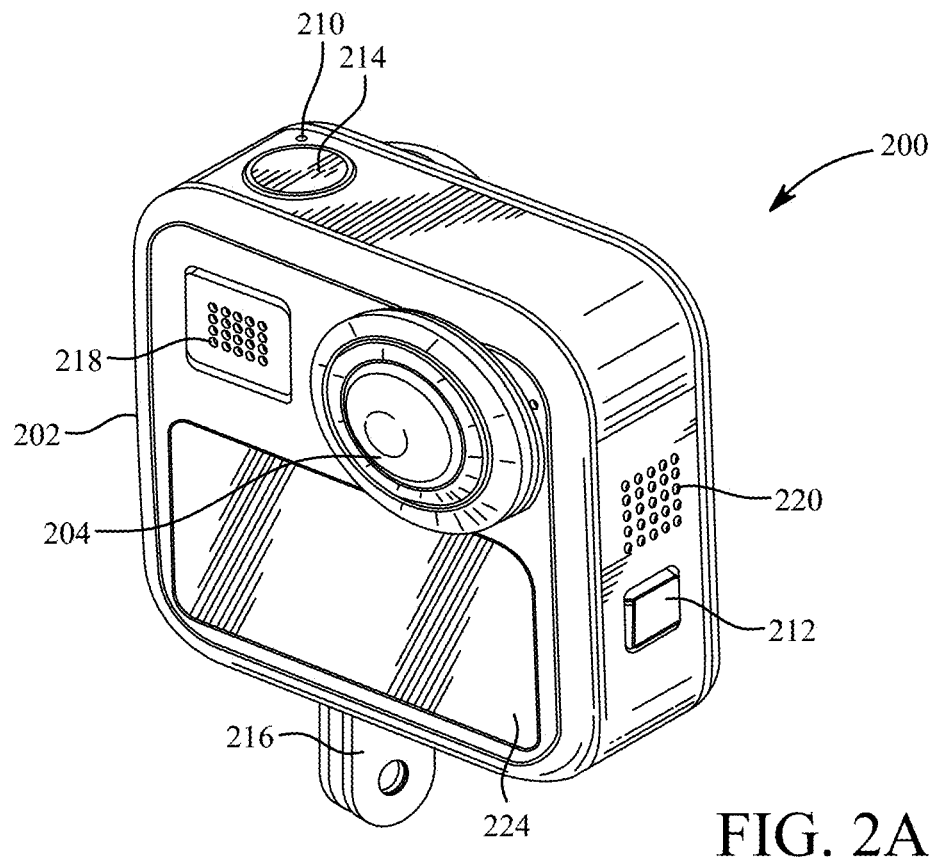
FIGS. 2A-B are isometric views of another example of an image capture device.
Figure 2B:
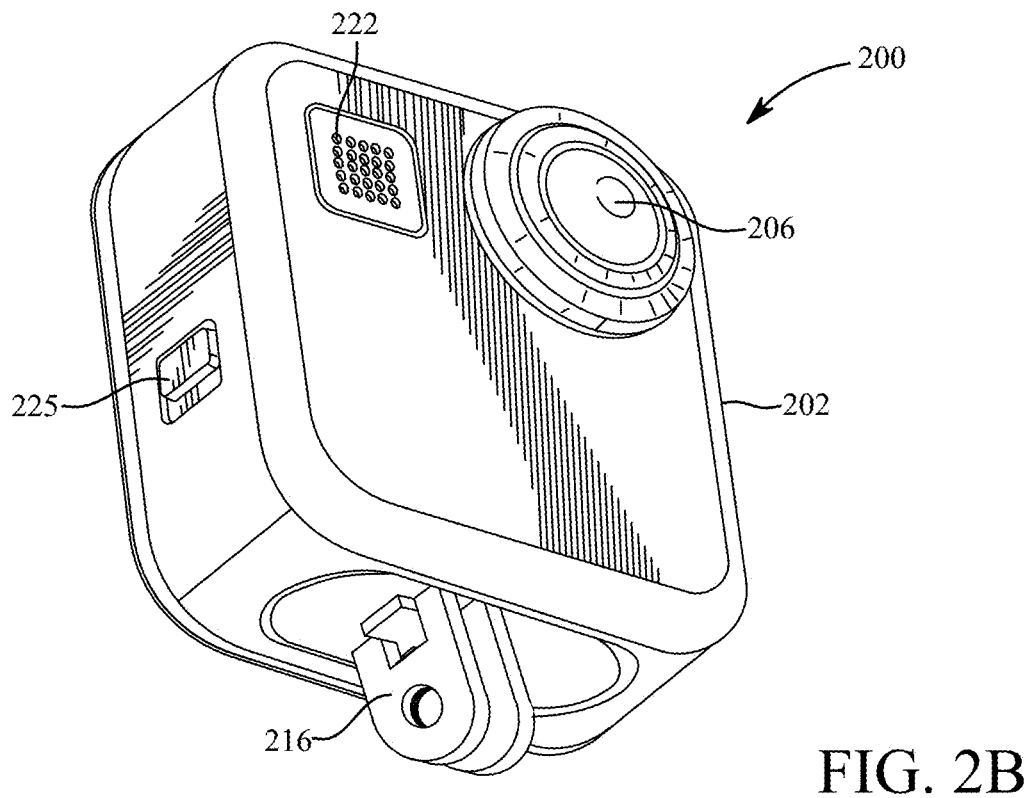

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2D:
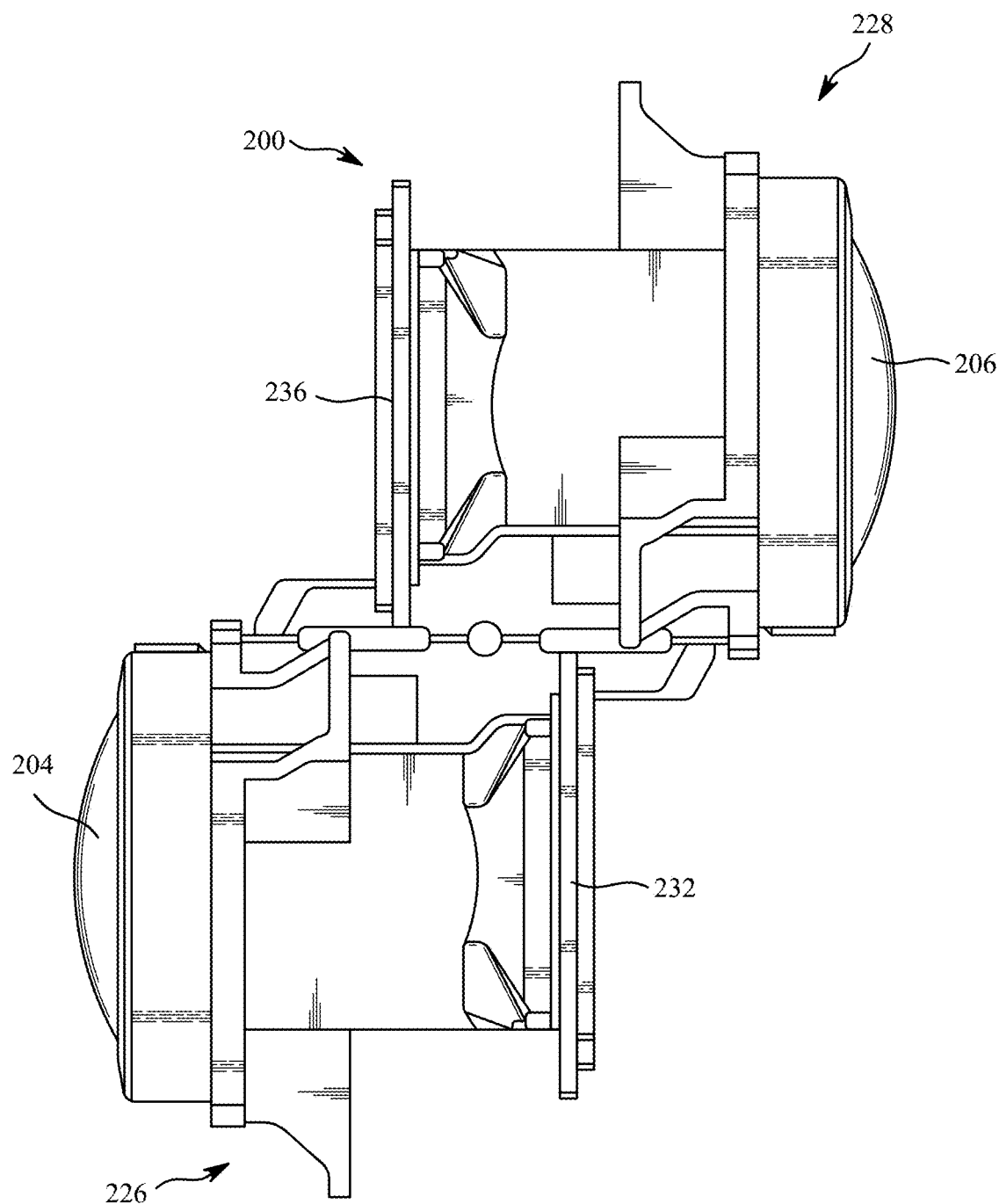
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

Figure 3:
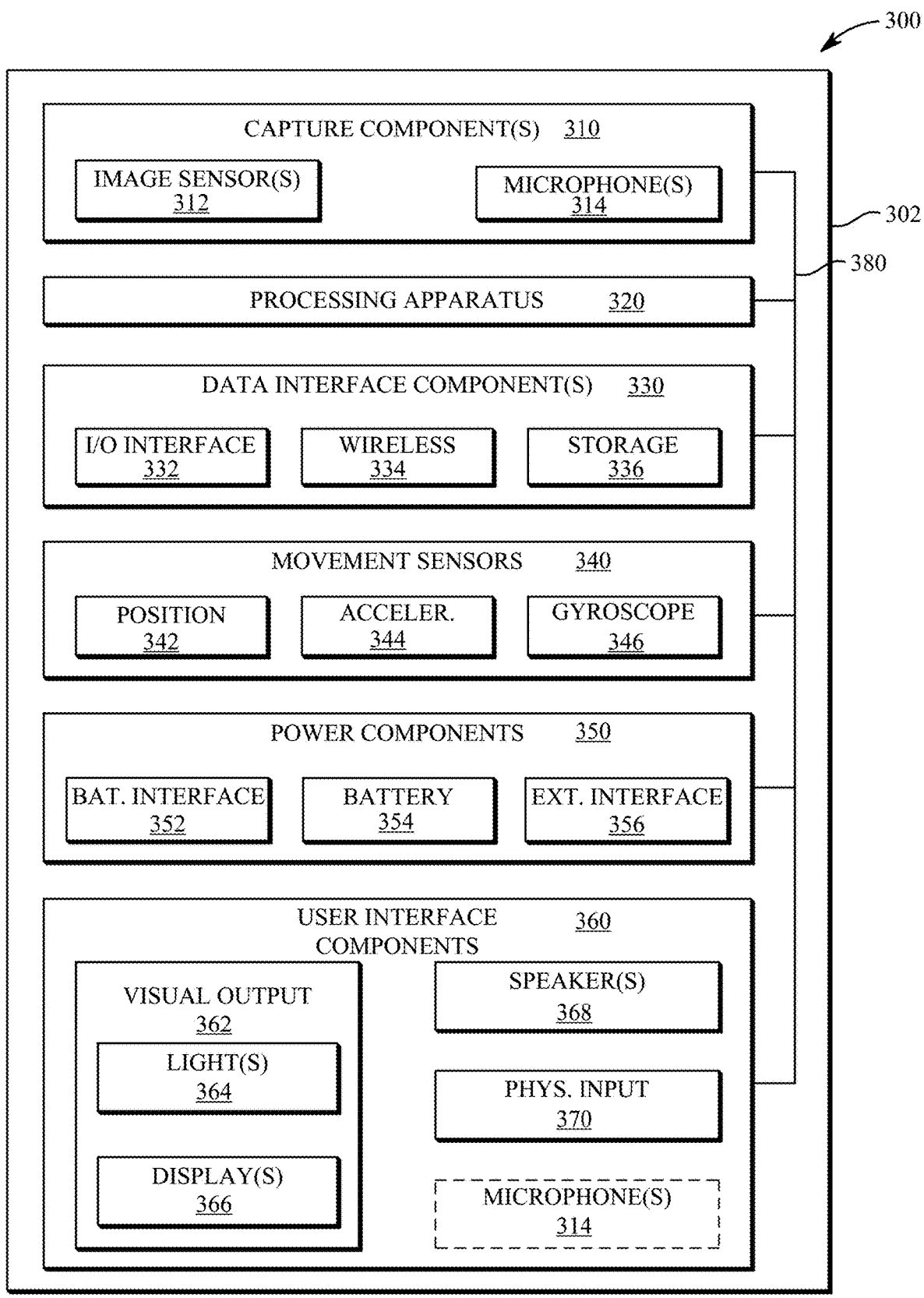
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 4:
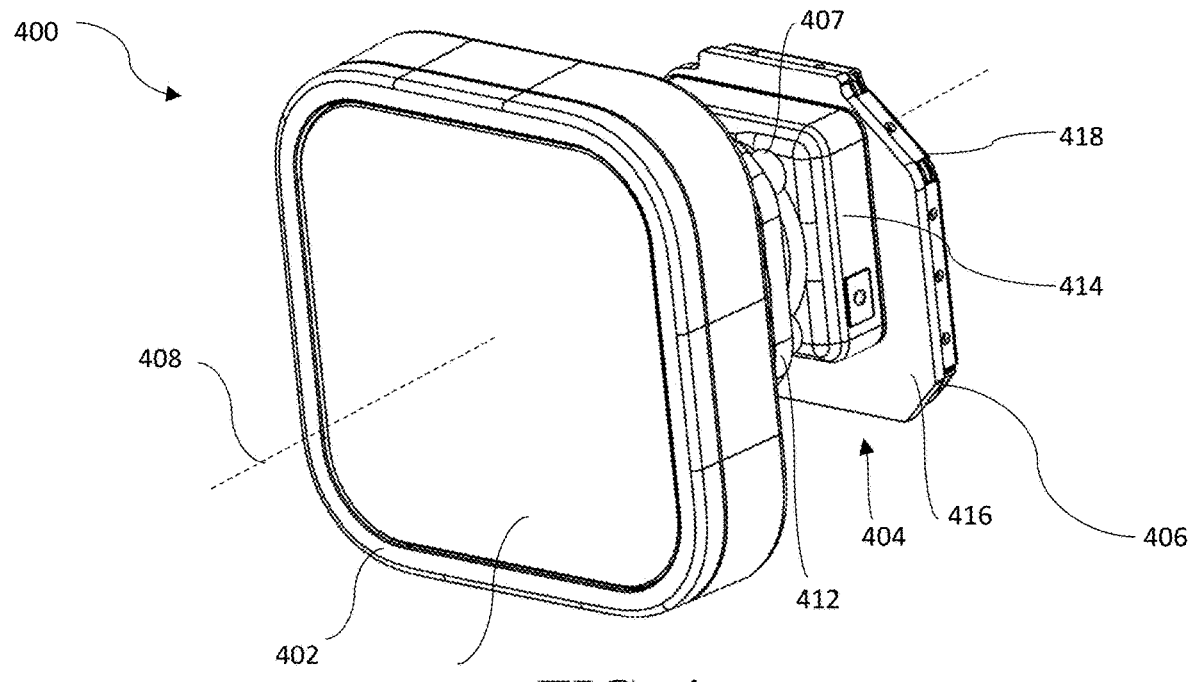
FIG. 4 is a perspective view of an optical system removed from an image capture device.

FIG. 4 is a perspective view of an optical system 400. The optical system 400 can be used as a part of the image capture devices 100, 200 of FIGS. 1A and 2A-2B to take images or videos. The optical system 400 is located within the image capture device so that the image capture device protects the optical system 400. The optical system 400 includes a lens module 402 located in front of an integrated sensor and lens assembly (ISLA) 404. An integrated sensor 406 is located behind a lens assembly 407 of the ISLA 404 and is aligned with the lens assembly 407 of the ISLA 404 and the lens module 402 along an axis 408 so that images or videos may be taken by the optical system 400. The integrated sensor 406 may be any image sensor discussed herein that is capable of supporting detection, capture, recording, and storage of an image, video, or both. An axis 408 extending through the optical system 400 may be a line of sight, an optical axis, a centerline through a field of view of the integrated sensor 406, or a combination thereof. The axis 408 may extend substantially through a center of the lens module 402, the ISLA 404, the optical system 400, or a combination thereof. The axis 408 may define a line of sight through the lens module 402 and the ISLA 404 along which images or videos may be detected.

The lens module 402 is connected to a front of an image capture device such as the image capture devices 100, 200 of FIGS. 1A and 2A-2B. The lens module 402 includes a lens 410 that may be interchangeable or affixed. The lens 410 may be changed by a user depending upon desires of the user. For example, the lenses 410 may be changed between a wide-angle lens, a telescoping lens, a filtered lens, or a combination thereof. The lens 410 may be fixed with a specific lens module 402 and a different lens module 402 may include a different lens. The lenses 410 may allow the image capture device to be adapted for multiple different needs of a user. The lens 410 may be a concave lens, a convex lens, a fisheye, a waterproof lens, an underwater lens, a flat lens, a filtered lens, a magnifying lens, or a combination thereof. The lens module 402 can be disconnected and reconnected to the image capture device to adapt and change to the user's needs or desires. The lens 410 may be removed and changed without changing the ISLA 404.

The lens module 402 is connected directly to a forward surface of the image capture device (not shown) and assists in sealing the ISLA 404 within the image capture device. The ISLA 404 of the optical system 400 may be free of a connection with the integrated sensor 406. The integrated sensor 406 may be connected directly to a frame of the image capture device or a heat sink of the image capture device. The integrated sensor 406 may be directly connected to the lens assembly 407 of the ISLA 404. The integrated sensor 406 may be suspended from a rear surface of the lens assembly 407 of the ISLA 404 so that the integrated sensor 406 and the lens assembly 407 are aligned relative to one another or form an ISLA 404 that is a single unit. The integrated sensor 406 and the lens assembly 407 are located along the axis 408 so that the integrated sensor 406 is axially aligned with an image sensor that detects image information through the lenses of the ISLA 404. The integrated sensor 406 may be sized relative to the lens assembly 407 such that the integrated sensor 406 may be a similar size or larger than the lens assembly 407.

A size of the integrated sensor 406 may be varied depending upon an amount of functionality, computing speed, computing power, clarity of images or videos detected, storage size, or a combination thereof. As the integrated sensor 406 is upgraded, the size of the integrated sensor 406 may increase in relative to a size of the lens assembly 407 such that the integrated sensor 406 blocks connection of the lens assembly 407 and/or the ISLA 404 within the image capture device from a rear position along the axis 408. In other words, the integrated sensor 406 may cover or obscure all or a portion of a rear surface of the lens assembly 407 when viewed along the axis 408 from a rear position. For example, a footprint of the integrated sensor 406 (e.g., surface area or total area when observed from a rear view along the axis 408) may be larger than a footprint of the lens assembly 407 and/or the ISLA 404. For example, the integrated sensor 406 may prevent fasteners from extending around the integrated sensor 406 such that any part of the ISLA 404 may be connected from a rear direction. The footprint of the integrated sensor 406 may be a total area that the integrated sensor 406 covers in an axial direction along the axis 408. For example, if the forward end 412 of a the ISLA 404 extends outward from the rearward end 414 of the ISLA 404 in a first direction and the rearward end 414 extends beyond the forward end 412 in a second direction, the footprint may be greater than the surface area of both the forward end 412 and the rearward end 414 as the non-overlapping regions are added into the footprint.

The footprint may be a foot print of the integrated sensor 406 relative to all other components of the ISLA 404 (e.g., the lens assembly 407). The footprint of the integrated sensor 406 may cover about 50 percent or more, 60 percent or more, 75 percent or more, 90 percent or more, or about 100 percent of a footprint, surface, or surface area of the lens assembly 407 and/or the ISLA 404 when viewed along the axis 408. For example, if the integrated sensor 406 covers 50 percent or more of the lens assembly 407 and/or the ISLA 404 then when viewed along the axis 408 in a forward facing direction (i.e., from a rear side), the integrated sensor 406 will block 50 percent or more of the footprint of the lens assembly 407 and/or the ISLA 404.

The ISLA 404 has a midpoint and the integrated sensor 406 may cover all of the lens assembly 407 and/or the ISLA 404 from the midpoint to a location below the ISLA 404 or from the midpoint to a location above the ISLA 404. The integrated sensor 406 may cover all of the ISLA 404 but a top quarter or a bottom quarter. The integrated sensor 406 may cover all of the corners or edges of the lens assembly 407 and/or the ISLA 404 such that none of the lens assembly 407 and/or the ISLA 404 is visible along the axis 408 when viewed from a rear direction facing a forward direction. The integrated sensor 406 includes a forward side 416 that connects to a rearward end 414 of the lens assembly 407 of the ISLA 404. The forward side 416 extends substantially parallel to a rearward side 418 of the integrated sensor 406 with all of the components of the integrated sensor 406 located therebetween.

Figure 5A:
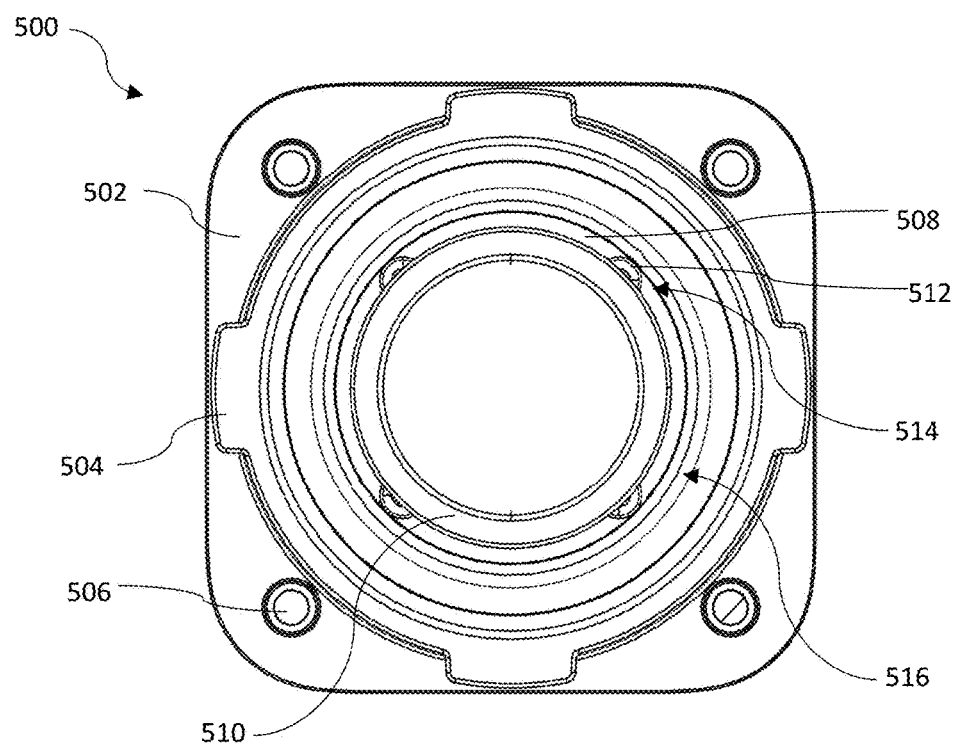
FIG. 5A is a plan view of the optical system of FIG. 4 with the lens module removed so that the modular lens is exposed.
Figure 5B:
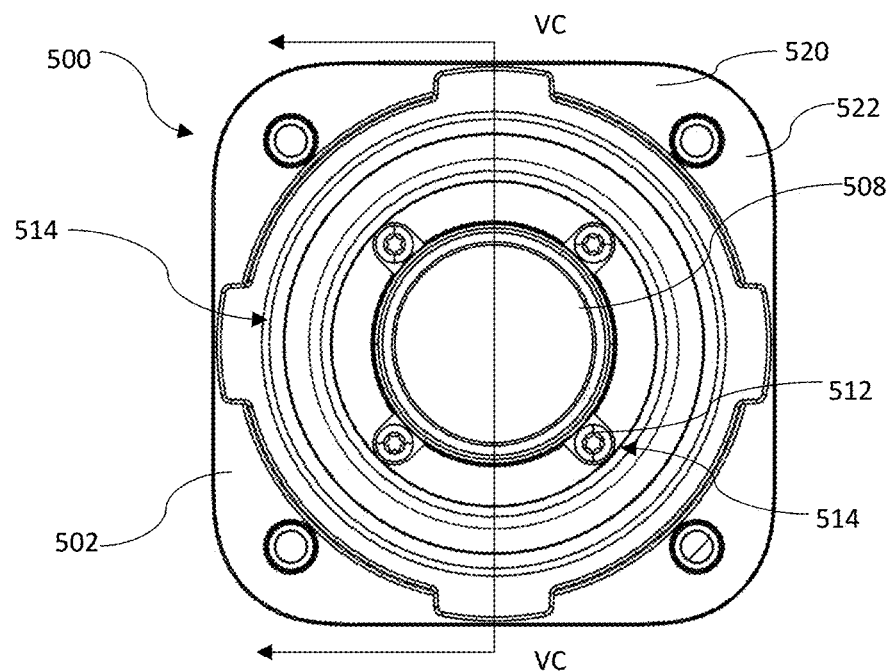
FIG. 5B is a front view of the optical system of FIG. 5A with the lens and module lens removed, exposing the bayonet and mounting screws.
Figure 5C:
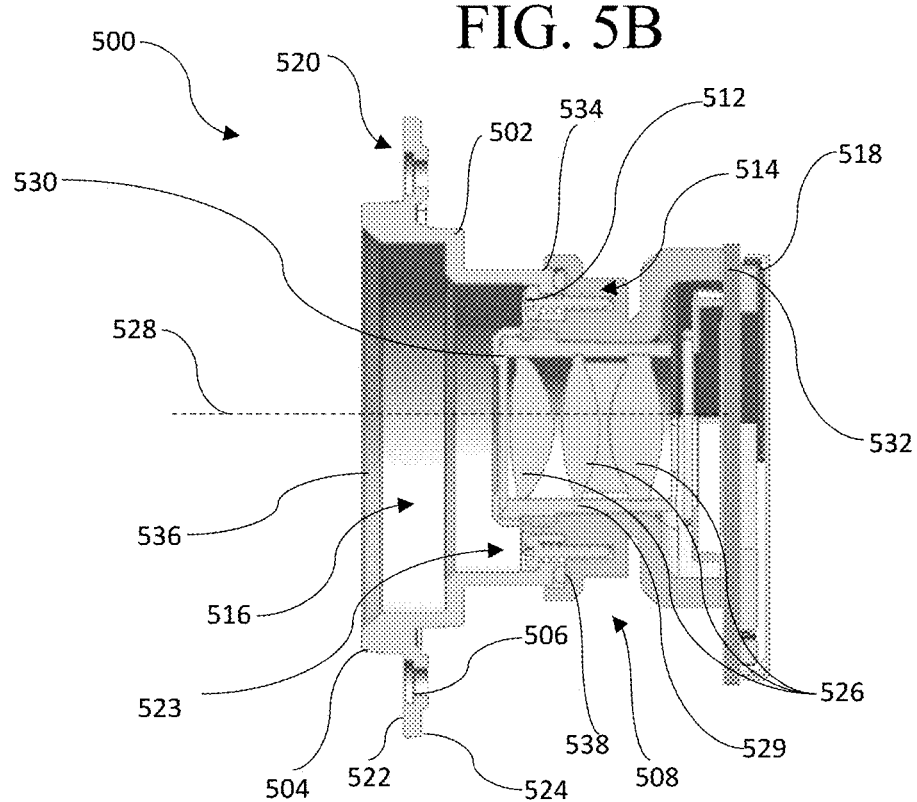
FIG. 5C is a cross-sectional view of the optical system of FIG. 5B along lines VC-VC illustrating the ISLA, bayonet, and mounting screws.

FIGS. 5A-5C illustrate various views of an optical system 500 similar to the optical system 400 of FIG. 4 in order to describe the interconnections and components of the optical system 500. FIG. 5A is a front view of the optical system 500 with a portion of a lens module similar to the lens module 402 removed and a mounting structure visible. Mounting structures may be used to connect the optical system 500 within an image capture device or to a body portion of the image capture device such as the image capture devices 100, 200 of FIGS. 1A and 2A-2B. The mounting structure is depicted as a bayonet 502 that includes fingers 504 projecting out from the bayonet 502. The fingers 504 may be male portions that extend into a female portion of the lens module 402 to form a connection or vice versa. The fingers 504 may be coupled using snap locks, twist locks, an interference fit, sliding locks, axial receipt of the lens module 402 with rotational lock of the fingers 504 of the bayonet 502, or a combination thereof.

The bayonet 502 functions to align some or all of the components along the axis 408 of FIG. 4 such that the axis 408 serves as an optical axis. The bayonet 502 includes fastener recesses 506 that receives fasteners (not shown) to connect the bayonet 502 to an image capture device such as the image capture devices 100, 200 of FIGS. 1A and 2A-2B. A lens module such as the lens module 402 of FIG. 4 may connect to a forward surface of the bayonet 502 via the fingers 504 while a ISLA 508 may connect to and extend from a rear surface of the bayonet 502, that is, a surface of the bayonet 502 opposite the lens module 402. A modular lens 510 is located in front of the ISLA 508 and is removable from the bayonet 502, with the lens module 402. However, modular lens 510 may be removable separate from the lens module 402. When the modular lens 510 is removed, a different modular lens 510 may be installed providing different functions (e.g., wide angle, telescopic, a color filter). The modular lens(es) 510 may change how the camera functions (e.g., a look of an image or video) while providing protection to the lens module 402 once connected within the image capture device via a bayonet 502.

The modular lens 510 may be connected directly to the bayonet 502, directly to the ISLA 508, directly to a body of the image capture device, within the lens module 402, or a combination thereof either directly or indirectly. The modular lens 510 may directly connect to the bayonet 502 and may be removable from the bayonet 502 or indirectly to the bayonet 502 via the lens module 402. The modular lens 510 may be free of contact or direct contact with the ISLA 508. The modular lens 510 and the ISLA 508 may be decoupled and the modular lens 510 may be removed without the ISLA 508 being removed. The modular lens 510 may fully or partially obscure the ISLA 508 when the modular lens 510 is in an installed position as is shown. The modular lens 510 may form a threaded connection, press fit connection, be fastened to, or a combination thereof the lens module 402. The modular lens 510 may connect to the bayonet 502 through fingers 504 so that the bayonet 502 aligns the ISLA 508 and the modular lens 510. For example, the connection recesses 514 may receive fasteners 512 that connect and axially align the ISLA 508 with the bayonet 502, and the modular lens 510 may be connected to the bayonet 502 within the central portion 516 so that the bayonet 502 axially aligns the modular lens 510 and the ISLA 508.

The modular lens 510 may be located in front (e.g., in a forward direction along the axis 408 shown in FIG. 4) of the ISLA 508 and may be axially aligned with the ISLA 508 along the axis 408. The ISLA 508 may be located on the rear surface 524 (see, e.g., FIG. 5C) of the bayonet 502 and the fasteners 512 may extend from a forward surface 522 (see, e.g., FIG. 5C) of the bayonet 502 through the connection recesses 514 in the bayonet 502 into the ISLA 508 so that the ISLA 508 is aligned via the connection with the bayonet 502 along the axis 408 of FIG. 4. The bayonet 502 may be connected or connectable within the image capture device before the ISLA 508, the modular lens 510, or both are connected. The bayonet 502, the ISLA 508, the modular lens 510, lens module 402, or a combination thereof may be connected or connectable before being connected within the image capture device such as the image capture devices 100, 200 of FIGS. 1A-2B. The ISLA 508 may be connected to the bayonet 502 through a forward surface so that an integrated sensor 518 (see, e.g., FIG. 5C) does not interfere with forming the connection between the bayonet 502 and the ISLA 508.

FIG. 5B illustrates the bayonet 502 having a mounting flange 520 with a first surface or a forward surface 522 that mates the bayonet 502 with the image capture devices 100, 200 of FIGS. 1A and 2A-2B. The modular lens 510 and lens module 502 are removed so that the ISLA 508, the fasteners 512, and the connection recesses 514 are all exposed. The connection recesses 514 are located within the central portion 516 of the bayonet 502 so that the modular lens 510 covers the ISLA 508 and all or a portion of the fasteners 512 when viewed along the axis 408 (See FIG. 5A). The connection recesses 514 of the bayonet 502 receive the modular lens 510 so that the lens module 402 of FIG. 4 and the modular lens 510 connect to the bayonet 502 by the fingers 504. However, the lens module 402 (e.g., a different lens module 402) may be installed that is free of the modular lens 510.

The bayonet 502 also includes an inner flange 523 that is located within the connection recesses 514. The inner flange 523 connects the ISLA 508 to the bayonet 502 so that the ISLA 508 is aligned within the bayonet 502. The inner flange 523 and ISLA 508 receive fasteners 512 to form a connection with the bayonet 502. The inner flange 523 may connect to the ISLA 508 via other fasteners (not shown) such as by a threaded connection, welding, an interference fit, gluing, a bolt, a detent, a locking tab, a finger, a twist lock, or a combination thereof. The inner flange 523 may be an annular surface. The inner flange 523 may extend within a same plane as the mounting flange 520. The inner flange 523 may extend towards a center of the bayonet 502. The inner flange 523 may extend in an opposite direction as the mounting flange 520. The inner flange 523 may be accessible from a forward direction of the bayonet 502 (e.g., a same direction that the modular lens 510 extends into the bayonet 502).

FIG. 5C is a cross-sectional view of the optical system 500 of FIG. 5B along lines VC-VC. The ISLA 508 is concentrically located within or behind the central portion 516 of the bayonet 502 to assist in the alignment of all of the components together. Substantially all or all of the ISLA 508 may be located on a second side or rear surface 524 of the bayonet 502. The ISLA 508 includes internal lenses 526 that are aligned along an axis 528. The axis 528 is an optical axis extending through the bayonet 502 and the ISLA 508. A lens assembly 529 of the ISLA 508 has a forward end 530 that connects to the bayonet 502. The lens assembly 529 has a rearward end 532 that connects to a forward side of the integrated sensor 518. The forward end 530 of the lens assembly 529 may extend so that the forward end 530 of the lens assembly 529 is coplanar with the connection recesses 514 or with a rearward end 534 of the bayonet 502. The forward end 530 of the lens assembly 529 may extend past the rearward end 534 of the bayonet 502 towards the forward end 536 of the bayonet 502 as measured along the axis 528 so that the forward end 530 is located within the central portion 516.

The ISLA 508 may have a cantilever-style connection with the bayonet 502 via the fasteners 512 and connection recesses 514 so that the only connection of the ISLA 508 is at a forward end 530 of the lens assembly 529 via the fasteners 512 and the connection recesses 514. The fasteners 512 extend from a forward direction into the inner flange 523 and then into the lens assembly 529 of the ISLA 508. The rearward end 532 of the lens assembly 529 may be free of any connection to the bayonet 502. The lens assembly 529 may connect to the bayonet 502 via virtually any type of connection. For example, the connection may be a mechanical connection such as a fastener, a threaded connection, a direct connection where the bayonet 502 and the lens assembly 529 connect without any intermediate members, an interference fit, a friction fit, an adhesive, melting, welding, heat staking, or a combination thereof.

The optical system 500 includes the bayonet 502 with the fingers 504 that connect the bayonet 502 to a lens module such as the lens module 402 of FIG. 4. The bayonet 502 also includes the fastener recesses 506 to connect the optical system 500 to the image capture device such as the image capture devices 100, 200 of FIGS. 1A-2B. The bayonet 502 is connected to the ISLA 508 via the fasteners 512 that extend through the connection recesses 514 of the central portion 516 of the bayonet 502. The central portion 516 is a recess that receives all or a portion of the modular lens 510 of FIG. 5A. The central portion 516 has a forward end 536 and a rearward end 538 (which is located substantially at the same location as the rearward end 534 of the bayonet 502) that define an axial length along the axis 528. The forward end 538 aligns with the inner flange 523 and the fasteners 512 extend through the inner flange 523 into the forward end 538 so that the ISLA 508 is connected proximate to the central portion 516. The central portion 516 may be sufficiently large so that the length, a cross-sectional thickness, or both of the modular lens 510 entirely fits within the central portion 516 of the bayonet 502. The central portion 516 may be large enough so that the modular lens 510 fits therein and may be covered by the lens module (e.g., lens module 402 of FIG. 4). The central portion 516 may be sufficiently large so that multiple different sizes and shapes for the modular lens 510 may fit therein. The central portion 516 may be sized to accommodate different modular lenses 510 that may be available to a user.

For example, a length of the modular lens 510 may be longer than a length of the central portion 516 such that a portion of the modular lens 510 extends out of the central portion 516, but an entire periphery (i.e., a cross-sectional thickness) may be located within an area of the central portion 516. The central portion 516 may have a length of about 2 mm or more, 5 mm or more, 7 mm or more, 1 cm or more, 2 cm or more, or 3 cm or more. The central portion 516 may have a length of about 10 cm or less, 8 cm or less, 6 cm or less, or 4 cm or less. The central portion 516 includes a pair of concentric members that are also concentric with the ISLA 508. The central portion 516 and the modular lens 510 may have substantially a same length. An end (e.g., forward end) of the central portion 516 and an end of the modular lens 510 may be coplanar. The central portion 516 may have any shape that receives the modular lens 510, connects to the ISLA 508, or both. The central portion 516 may be circular, square, oval, rectangular, triangular, symmetrical, asymmetrical, or a combination thereof. The central portion 516 may have a shape that is two or more concentric circles, three or more concentric circles, or even four or more concentric circles.

The central portion 516 of the bayonet 502 aligns the lens assembly 529 with the integrated sensor 518 and the modular lens 510 of FIG. 5A. The integrated sensor 518 has a line of sight or optical axis 528 through the ISLA 508 and the modular lens 510 so that images or videos may be detected, then captured by the image capture device that includes the ISLA 500. A forward side of the integrated sensor 518 may be connected to the rearward end 532 of the lens assembly 529 to form the ISLA 508. The bayonet 502 includes a mounting flange 520 to connect the bayonet 502 to a body of the image capture device. The mounting flange 520 may be any shape so that the mounting flange 520 connects the bayonet 502 within or to an image capture device such as the image capture devices 100, 200 of FIGS. 1A-2B. The mounting flange 520 may be circular, square, triangular, polygonal, symmetrical, asymmetrical, or a combination thereof. The mounting flange 520 includes the forward surface 522 and the rearward surface 524. The fastener recesses 506 extend from the forward surface 522 to the rearward surface 524 through the mounting flange 520. The fasteners 512 extend parallel to the optical axis 528 so that the forward end 530 and the rearward end 532 of the ISLA 508 are aligned substantially along the optical axis 528 (e.g., parallel).

The mounting flange 520 may be a planar surface that extends outward around all or a portion of the bayonet 502 (e.g., a circumferential flange around the central portion 516) so that when the bayonet 502 is connected to an image capture device (e.g., the image capture device 100, 200 of FIGS. 1A-2B) the bayonet 502 is aimed in a predetermined direction. The mounting flange 520 may extend in a direction substantially perpendicular to the optical axis 528 (e.g., within about ±1 degree or less, ±0.5 degrees or less, or about ±0.1 degree or less). The mounting flange 520 may orient the bayonet 502. The mounting flange 520 may orient the ISLA 508, the lens assembly 529 and the corresponding internal lenses 526, and the integrated sensor 518 along the optical axis 528. The internal lenses 526 may be located along the optical axis 528 within the lens assembly 529. The internal lenses 526 may be positioned by positioning the lens assembly 529 relative to the bayonet 502. The internal lenses 526 of the lens assembly 529, once attached within the image capture device, may be a fixed type of lens. The internal lenses 526 may be one or more lenses, two or more lenses, or three or more lenses. The internal lenses 526 may be flat, concave, convex, plano-convex, plano-concave, bi-convex, bi-concave, positive meniscus, negative meniscus, or a combination thereof.

Figure 6:
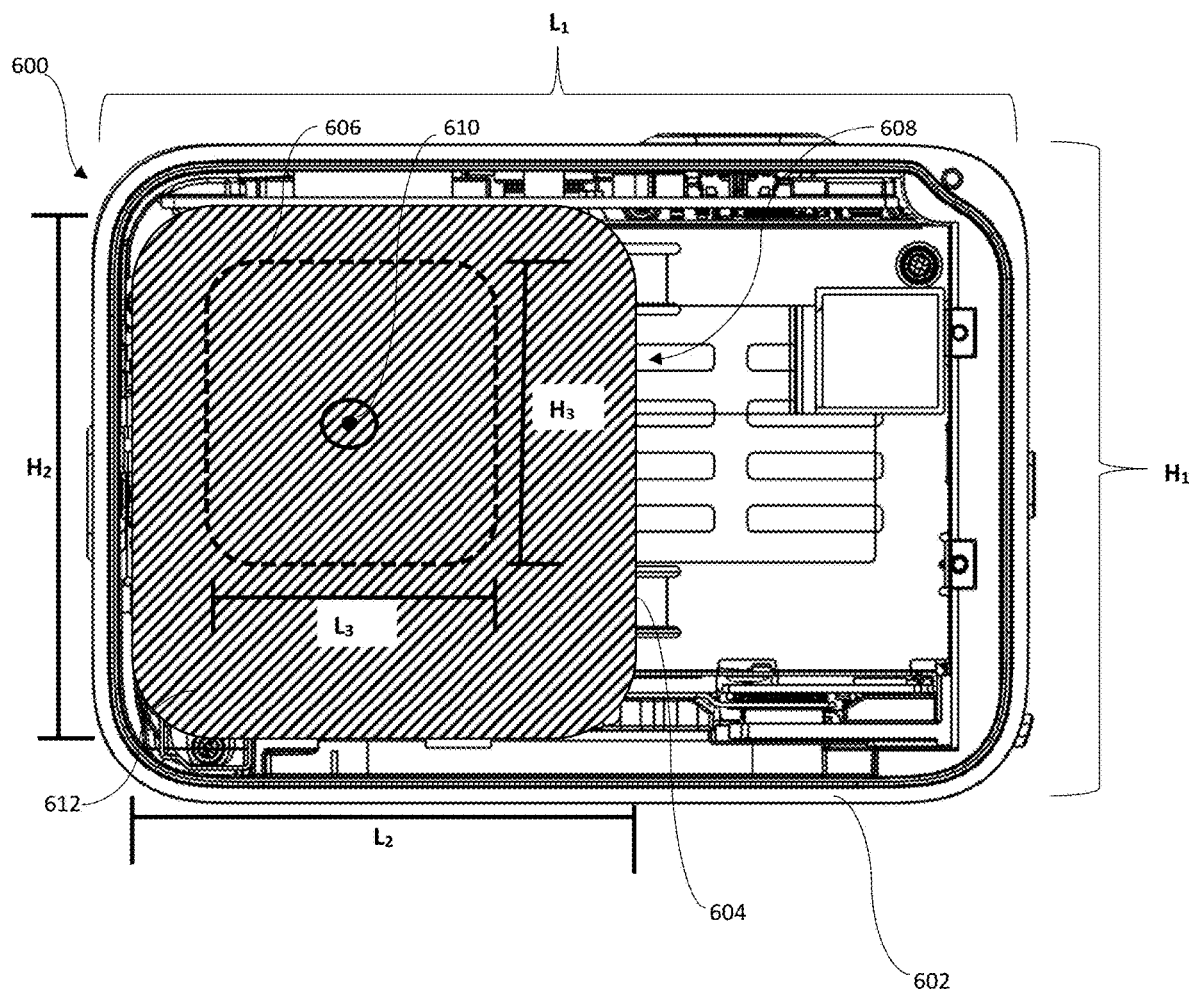
FIG. 6 is a rear plan view of the image capture device of FIGS. 1A-B with the rear removed and the integrated sensor exposed.

FIG. 6 is a rear view of an image capture device 600 similar to the image capture devices 100, 200 of FIGS. 1A-2B with a rear cover or portion removed so that internal components are exposed. The image capture device 600 includes a body 602 with a length $L_1$ and a height $H_1$ illustrating a footprint (e.g., area or surface area) of the image capture device 600. An integrated sensor 604 is located within the body 602, and the integrated sensor 604 has a length $L_2$ and a height $H_2$ illustrating a footprint of the integrated sensor 604. A lens assembly 606 of an ISLA 608 is shown in dotted line and includes an axis 610 extending through the lens assembly 606 and integrated sensor 604 of the ISLA 608. The lens assembly 606 has a length $L_3$ and a height $H_3$ illustrating a footprint of the lens assembly 606 of the ISLA 608. The footprint of the integrated sensor 604 is greater than the footprint of the lens assembly 606 such that the integrated sensor 604 completely covers or conceals the lens assembly 606 in the rear view of FIG. 6 along the axis 610. The footprint of the integrated sensor 604 may cover or conceal about 20 percent or more, about 30 percent or more, about 40 percent or more, or about 50 percent or more of the footprint of the lens assembly 606, an inside of the image capture device 600, or both. The footprint of the integrated sensor 604 may cover or conceal about 100 percent or less, 90 percent or less, 80 percent or less, or 70 percent or less of a footprint of the lens assembly 606, an inside of the image capture device 600, or both. The footprint of the integrated sensor 604 may cover between about 50 percent and 100 percent of the lens assembly 606 or about 80 percent and about 100 percent of the lens assembly 606.

The footprint of the integrated sensor 604, when oriented along a rearward end 612 of the integrated sensor 604 along the axis 610, is shown as filling about half of the image capture device 600. The integrated sensor 604 may fill all or a portion of a footprint of the body 602. The footprint of the integrated sensor 604 may fill 30 percent or more, 40 percent or more, or even 50 percent or more of a footprint of the body 602. As functionality of the integrated sensor 604 increases, the footprint of the integrated sensor 604 may consume more of a footprint of the body 602. As the footprint of the integrated sensor 604 relative to the packing space of the image capture device 600, the ISLA 608, or both is increased, the amount of space to extend around the integrated sensor 604 is correspondingly decreased. Thus, forming a connection with the ISLA 608 from a rear side is challenging as the integrated sensor 604 obscures the ISLA 608.

The present teachings include a mounting structure that avoids fastener interference with the fasteners extending around a footprint of the integrated sensor 604 such that a size of the footprint is not a factor in connecting the ISLA 608 within the body 602. The length ($L_1$) of the body 602 of the image capture device 600 is substantially equal to or greater than the length ($L_2$) of the sensor 604. The length ($L_1$) has a ratio with the length ($L_2$) of about 1:1 or more, about 1.2:1 or more, bout 1.5:1 or more, about 1.8:1 or more, or about 2:1 or more. The length ($L_1$) has a ratio with the length ($L_2$) of about 5:1 or less, about 3:1 or less, or about 2:1 or less. The height ($H_1$) of the body 602 is substantially equal to or greater than the height ($H_2$) of the integrated sensor 604. The height ($H_1$) may have a ratio with the height ($H_2$) of about 1:1 or more, about 1.1:1 or more, about 1.2:1 or more, about 1.3:1 or more, or about 1.5:1 or more. The height ($H_1$) may have a ratio with the height ($H_2$) of about 2:1 or less, about 1.8:1 or less, about 1.7:1 or less, or about 1:6:1 or less. The height ($H_2$) of the integrated sensor 604 fits within the body 602 of the image capture device 600 but may be substantially equal to the height ($H_1$) of the body 602.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
   a bayonet comprising:
      a mounting flange that connects the bayonet to a first surface of the image capture device;
      a central portion; and
      connection recesses located within the central portion at a rearward end of the central portion;
   an integrated sensor and lens assembly (ISLA) comprising:
      an optical axis, wherein the ISLA extends from the rearward end of the central portion of the bayonet along the optical axis;
      a forward end that aligns with the connection recesses;
      a rearward end;
      internal lenses located within the ISLA and aligned along an optical axis; and
      an integrated sensor connected to the rearward end and aligned with the internal lenses along the optical axis; and
   fasteners extending through the central portion into the forward end to connect the ISLA to the rearward end of the central portion of the bayonet.

2. The image capture device of claim 1, wherein the bayonet includes a forward end and a rearward end, wherein the forward end of the ISLA faces the rearward end of the bayonet, and wherein the fasteners extend from a forward end of the bayonet through the connection recesses of the bayonet into the forward end of the ISLA to connect the ISLA to the bayonet.

3. The image capture device of claim 1, wherein the ISLA forms a cantilever-style connection with the bayonet via the fasteners and the connection recesses.

4. The image capture device of claim 3, wherein the central portion is a recessed portion of the bayonet that extends into the image capture device.

5. The image capture device of claim 4, wherein the central portion receives all or a portion of a modular lens.

6. The image capture device of claim 1, further comprising:
   a modular lens that extends into the central portion and covers all or a portion of the fasteners when viewed along the optical axis of the ISLA.

7. The image capture device of claim 6, wherein the modular lens is free of direct contact with the ISLA.

8. An image capture device comprising:
   a body comprising:
      a forward surface; and
      a rearward surface; and
   an integrated sensor and lens assembly (ISLA) located entirely within the body of the image capture device between the forward surface and the rearward surface, wherein the ISLA comprises:

a lens assembly that comprises:
  a forward end;
  a rearward end;
  internal lenses located within the lens assembly and spaced along an optical axis between the forward end and the rearward end; and
  an integrated sensor connected to the rearward end of the lens assembly and extending along the optical axis towards the rearward surface of the body,
wherein the rearward end of the lens assembly has a footprint and the integrated sensor has a sensor footprint, and
wherein the sensor footprint conceals between about 50 percent and about 100 percent of the footprint of the lens assembly when viewed along the optical axis.

9. The image capture device of claim 8, wherein between about 80 percent and about 100 percent of the footprint of the lens assembly is concealed by the sensor footprint when viewed along the optical axis.

10. The image capture device of claim 8, further comprising:
  a bayonet connected to the image capture device, wherein the ISLA has a cantilever-style connection with the bayonet.

11. The image capture device of claim 8, wherein fasteners extend into the forward end of the lens assembly to connect the ISLA to the image capture device.

12. The image capture device of claim 11, further comprising:
  a modular lens, wherein the lens assembly is located between the integrated sensor and the modular lens along the optical axis.

13. The image capture device of claim 11, further comprising:
  a lens module that extends over the ISLA that extends over and conceals the fasteners.

14. An image capture device comprising:
  a bayonet connected to the image capture device;
  an integrated sensor and lens assembly (ISLA) connected to the bayonet, wherein the ISLA comprises:
    a lens assembly comprising:
      a forward end; and
      a rearward end;
      an optical axis extending between the forward end and the rearward end; and
      an integrated sensor connected to the rearward end;
  fasteners extending through the bayonet into the forward end of the lens assembly;
  a modular lens located in front of the forward end of the lens assembly;
  a lens module connected to the bayonet and located forward of the modular lens and the ISLA, wherein the lens module, the modular lens, and the ISLA are axially aligned along an optical axis of the image capture device.

15. The image capture device of claim 14, wherein the lens module obscures the fasteners from view when the lens module is connected to the image capture device.

16. The image capture device of claim 14, wherein the lens module is removably connected directly to the bayonet.

17. The image capture device of claim 14, wherein the bayonet includes a central portion that is configured to receive the modular lens.

18. The image capture device of claim 14, wherein all or a portion of the ISLA, the fasteners, or both are obscured by the modular lens when viewing the image capture device facing a forward end of the ISLA.

19. The image capture device of claim 14, wherein the bayonet includes fingers and the fingers are configured to removably connect to the lens module.

20. The image capture device of claim 14, wherein the modular lens extends into an inner flange of the bayonet.

* * * * *